United States Patent
Soomro et al.

(10) Patent No.: US 9,980,203 B2
(45) Date of Patent: May 22, 2018

(54) METHOD AND SYSTEM FOR SIGNALING AVAILABLE CHANNELS IN A WIRELESS NETWORK

(75) Inventors: Amjad Soomro, Hopewell Junction, NY (US); Dave Cavalcanti, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1279 days.

(21) Appl. No.: 11/908,511

(22) PCT Filed: Mar. 9, 2006

(86) PCT No.: PCT/IB2006/050749
§ 371 (c)(1),
(2), (4) Date: Sep. 13, 2007

(87) PCT Pub. No.: WO2006/097874
PCT Pub. Date: Sep. 21, 2006

(65) Prior Publication Data
US 2008/0280621 A1 Nov. 13, 2008

Related U.S. Application Data

(60) Provisional application No. 60/661,434, filed on Mar. 14, 2005, provisional application No. 60/750,166, filed on Dec. 14, 2005.

(51) Int. Cl.
*H04W 48/08* (2009.01)
*H04W 36/00* (2009.01)
*H04W 88/08* (2009.01)

(52) U.S. Cl.
CPC ........ *H04W 48/08* (2013.01); *H04W 36/0072* (2013.01); *H04W 88/08* (2013.01)

(58) Field of Classification Search
CPC ............. H04W 24/02; H04W 72/0406; H04W 28/0268; H04W 36/0005; H04W 36/0083;
(Continued)

(56) References Cited

U.S. PATENT DOCUMENTS 6,188,681 B1 2/2001 Vesuna
6,421,328 B1 * 7/2002 Larribeau et al. ............ 370/329
(Continued)

FOREIGN PATENT DOCUMENTS

JP 11239382 8/1999
JP 2004/320702 * 11/2004
(Continued)

OTHER PUBLICATIONS 802.11j, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 7: 4.9 GHz-5 GHz Operation in Japan, 2004.*

*Primary Examiner* — George Eng
*Assistant Examiner* — Jing Gao

(57) ABSTRACT

In order to better and more easily identify candidate APs and/or channels, an AP can transmit frames announcing its capabilities in a channel where it is not serving. For example, if an AP is operating in channel 1 and has created a Basic Service Set ID (BSSID) in that channel, it is permitted to transmit frames announcing its capabilities in another channel, for example channel 3, where another AP may or may not be operating.

25 Claims, 5 Drawing Sheets

(58) Field of Classification Search
CPC ..... H04W 36/30; H04W 48/18; H04W 74/06; H04W 84/12; H04W 88/06; H04W 28/0289; H04W 36/0016
USPC ..... 455/432.1, 436, 439, 442; 370/331, 332, 370/338
See application file for complete search history.

(56) References Cited

U.S. PATENT DOCUMENTS

| | | | |
|---|---|---|---|
| 6,522,881 B1* | 2/2003 | Feder et al. | 455/437 |
| 7,260,395 B1* | 8/2007 | Hughes et al. | 455/432.2 |
| 8,054,798 B2 | 11/2011 | Jeong et al. | |
| 2002/0111158 A1* | 8/2002 | Tee | 455/421 |
| 2003/0224774 A1* | 12/2003 | Cheng et al. | 455/422.1 |
| 2004/0039817 A1* | 2/2004 | Lee et al. | 709/225 |
| 2004/0057899 A1 | 3/2004 | Forster et al. | |
| 2004/0063426 A1 | 4/2004 | Hunkeler | |
| 2004/0109425 A1* | 6/2004 | Scribano et al. | 370/331 |
| 2004/0176024 A1 | 9/2004 | Hsu et al. | |
| 2004/0218568 A1* | 11/2004 | Goodall | H04L 1/0002 370/332 |
| 2004/0246922 A1* | 12/2004 | Ruan et al. | 370/331 |
| 2004/0252696 A1 | 12/2004 | Kakishima et al. | |
| 2005/0002116 A1 | 1/2005 | Nakamura | |
| 2005/0003820 A1* | 1/2005 | Ozluturk | 455/436 |
| 2005/0009531 A1* | 1/2005 | Lindquist | H04W 36/30 455/452.2 |
| 2005/0130658 A1* | 6/2005 | Stephens | 455/436 |
| 2006/0056367 A1* | 3/2006 | Marinier et al. | 370/338 |

FOREIGN PATENT DOCUMENTS

| | | | | |
|---|---|---|---|---|
| JP | 2004320702 A | 11/2004 | | |
| JP | 2004343468 A | 12/2004 | | |
| WO | WO 2004/054283 A2 * | 6/2004 | | H04Q 7/00 |
| WO | WO 2004054283 A2 * | 6/2004 | | H04Q 7/00 |
| WO | 2004057899 A1 | 7/2004 | | |
| WO | WO 2004/098108 A2 * | 11/2004 | | |
| WO | 2005002116 A2 | 1/2005 | | |

\* cited by examiner

METHOD AND SYSTEM FOR SIGNALING AVAILABLE CHANNELS IN A WIRELESS NETWORK

CROSS REFERENCE TO RELATED APPLICATIONS

This application claims the benefits of provisional application Ser. No. 60/661,434, filed on Mar. 14, 2005 and provisional application Ser. No. 60/750,166, filed Dec. 14, 2005, the teachings of which are incorporated herein by reference.

The IEEE 802.11 standard specifies the medium access control (MAC) and physical layer characteristics for a wireless local area network (WLAN). The IEEE 802.11 standard is defined in International Standard ISO/IEC 8802-11, "IEEE Standard for Information technology—Telecommunications and information exchange between systems-Local and metropolitan area networks-Specific requirements, Part 11: Wireless LAN Medium Access Control (MAC) and Physical Layer (PHY) specifications," 1999 Edition [1], which is hereby incorporated by reference as if fully set forth herein. The following supplements to 802.11 are also herein incorporated by reference: IEEE 802.11h, IEEE TGk draft D 0.14, and IEEE TGe draft D8.0.

One of the design challenges in IEEE 802.11 networks is to minimize the roaming delay. Roaming occurs when a mobile station (STA) moves from the coverage area from one access point (AP) to another AP. Before a STA could begin exchanging data with the new AP, a STA, typically: 1) scans for and discovers potential AP/APs to which it can roam; 2) decides on the target AP to which it should roam; and 3) executes association, authentication, and resource allocation protocols, if any. Part of the roaming delay is due to the scan process, in which the mobile stations (STAs) try to find an access point (AP) candidate to start an association/re-association procedure. STAs can discover candidate APs for roaming by detecting beacons and via probe requests and responses.

IEEE 802.11, including TGk, previously incorporated by reference, provides for WLAN roaming capability. This specification provides for scanning for channels in a certain range that are permitted. To assist the system in scanning, a wireless station receives reports such as a Site Report or Neighbor Report collected from the APs that says which channels are available in the station's neighborhood. This reduces the amount of scanning required to determine available channels and minimizes a lag in transmission time. APs can also transmit information about available channels and other APs in the neighborhood in the form of periodic beacons, in response to measurement requests or autonomously. When a STA receives such information it knows of the existence of neighbor APs. However, there is no way for a STA to identify available APs at a particular location and time without switching to the operating channel of all of the APs in a list. Also, an AP can only transmit beacons in its serving channel. As a result, STAs associated with other APs operating in different channels in the same area are unable to discover the AP's capabilities, e.g., whether that AP is reachable by the STA and the received signal level from that AP.

Prior art roaming involves STA switching to an operating channel of an AP in the received neighbor list and determining the signal level from that AP. Therefore, even with a list of valid channels and/or neighbor APs, the STA may still have to choose between several candidates to start the roaming process. Further, if the STA selects a candidate AP outside its communication range, then the STA will have to try another candidate AP, which will increase the discovery delay. Additionally if the candidate AP is in the opposite direction to the STA's current direction of movement this will increase the delay. Also, if the STA chooses a candidate AP with a high traffic load, it may experience more delay because the AP may not be able to support a required service level.

A list of neighbor APs and/or channels may not always guarantee a small scan delay. In the prior art, a STA wastes time and energy trying to send a probe to an AP that is not within its coverage or may be overloaded due to the lack of information provided in the neighbor reports and channel lists.

Thus, in order to better and more easily identify candidate APs and/or channels, the invention allows an AP to transmit frames announcing its capabilities in a channel where it is not serving. For example, if an AP is operating in channel 1 and has created a Basic Service Set ID (BSSID) in that channel, it is permitted to transmit frames announcing its capabilities in another channel, for example channel 3, where another AP may or may not be operating.

This invention proposes, in one aspect, a method for signaling available channels in a wireless network including the steps of: communicating between an STA and an first AP in a channel; triggering a roaming event; transmitting at least one AP announcement frame from a second AP in the channel; receiving the at least one AP announcement frame in the channel in the STA; and determining whether the second AP is available for communication based, at least in part, on the received at least one AP announcement frame.

In one embodiment, the step of transmitting at least one AP announcement frame includes transmitting the at least one AP announcement frame in a non-service channel of an AP.

In another embodiment, the AP announcement frame includes at least one frame announcing service capabilities. In another embodiment, at least one AP announcement frame includes at least one frame announcing resource availability.

In one embodiment, the method includes the step of transmitting at least one AP announcement frame in the channel from the first AP.

In one embodiment, the step of transmitting at least one AP announcement frame occurs upon request of either the STA or another AP. In one embodiment, the step of transmitting at least one AP announcement frame further is an unsolicited transmission.

In one embodiment, the method includes the step of transmitting in the channel based on the determining step.

In another embodiment, the step of transmitting at least one AP announcement frame includes transmitting measurement information.

In one embodiment, the measurement information includes at least one neighbor report. In another embodiment, the measurement information includes at least one channel load report.

In one embodiment, the neighbor report includes at least one field consisting of: received power, PHY options, AP capabilities, channel number, and channel utilization fields.

In another embodiment, the determining step includes determining whether a channel is available for transmission based on the at least one AP announcement frame.

In one aspect, the invention includes a system for determining available channels in a wireless network that includes: a first AP capable of communicating with a STA in a channel; a second AP capable of transmitting at least one AP announcement frame in the channel; a STA for receiving the at least one AP announcement frame; and a processor for determining whether the second AP is available for communication based, at least in part, on the at least one AP announcement frame.

In one embodiment, a second AP transmits an AP announcement frame. In another embodiment, the AP announcement frame in a channel where it is not serving includes at least one bit corresponding to the AP's capabilities. In one embodiment, the STA receives the at least one AP announcement frame in its current operating channel from another AP transmitting in its non-serving channel. In another embodiment, the STA receives the at least one AP announcement frame from the second AP.

The invention enables an STA to identify which AP is within its coverage, the received signal strength from the APs, as well as resource availability in each AP. The invention enables a STA to determine the best AP to roam to in less time by avoiding attempts to scan or associate with APs that cannot support its service requirements or which are not reachable.

Figure 1:
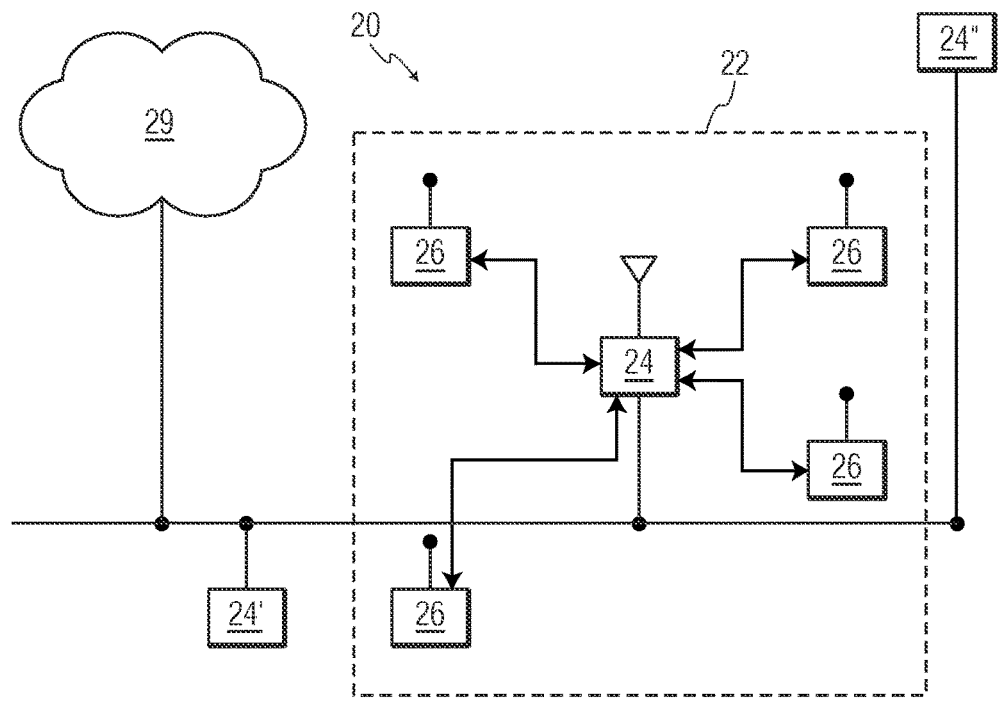
FIG. 1 depicts a WLAN.

FIG. 1 illustrates a wireless LAN (WLAN) 20 system for implementing the method of the invention. Wireless LAN 20 defines an infrastructure network which includes a plurality of cells 22. Cell 22 includes an access point (AP) 24 (which is sometimes referred to as a wireless local bridge or a base station).

With continued reference to FIG. 1, cell 22 may include remote network stations (STAs) 26. Access point 24 and remote STAs 26 may be the transmitters and receivers of the system. Each STA 26 may be a mobile, portable, or stationary terminal. Each STA 26 may be a desktop workstation, laptop computer, palm top computer, handheld personal computer, pen-based computer, personal digital assistant, handheld scanner, data collector, handheld printer, etc.

If present, AP 24 may be an interface for communicating between wireless network 20 and a wireline network. AP 24 may be configured to provide a communications gateway between STAs 26 and AP 24 that are in cell 22 and also between a wireline network and the STAs 26. AP 24 is typically configured to convert signals between wireline and wireless communications mediums. The conversion may allow the access point to pass communication information between the wireline network and wireless STAs 26. The wireline network may be coupled to an external network 29 (e.g., PBX, PSTN, Internet, etc.). AP 24' and AP 24" are additional APs with additional coverage areas to which STAs 26 can roam.

Figure 2:
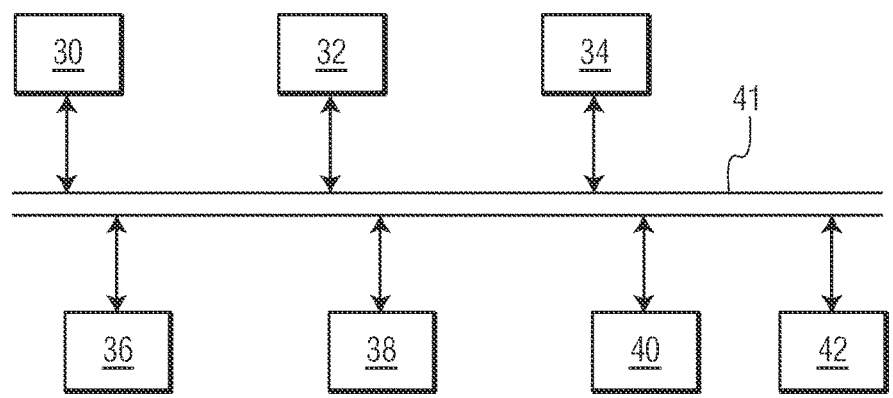
FIG. 2 illustrates a simplified block diagram of an access point (AP) and each station (STA) within a cell according to the embodiment of the present invention.

Referring now to FIG. 2, both an AP and a STA may include a display 30, a CPU 32, a transmitter/receiver 34, an input device 36, a storage module 38, a random access memory (RAM) 40, a read-only memory 42, and a common bus 41. Although the description may refer to terms commonly used in describing particular computer systems, the description and concepts equally apply to other processing systems, including systems having architectures dissimilar to that shown in FIG. 2. The transmitter/receiver 34 is coupled to an antenna (not shown) to transmit desired data and its receiver converts received signals into corresponding digital data. The CPU 32 operates under the control of an operating system contained in the ROM 42 and utilizes RAM 40 to perform the frequency selection within a wireless local area network (WLAN), by enabling the AP in an infrastructure network or a STA in an ad-hoc network, to provide a new channel or wireless link for the rest of stations (STAs).

In operation, in a typical 802.11-based wireless local area network (WLAN), such as wireless LAN 20 of FIG. 1, a plurality of STAs 26 may be associated with AP 24 if present. Each STA 26 may have different communications capabilities and requirements. AP 24 may manage the communications traffic between STAs 26 and the wireline network. AP 24 may manage the communications traffic by controlling when frames are transmitted to each remote STA 26 in cell 22. The communications traffic in cell 22 may include data frames (e.g., signals that carry frames to provide data communications), voice frames (e.g., signals that carry frames to provide voice communications), real-time frames (e.g., signals that carry frames to provide real-time communications such as multimedia or voice communications), management frames (e.g., signals that carry frames to provide network management communications), etc.

Figure 3:
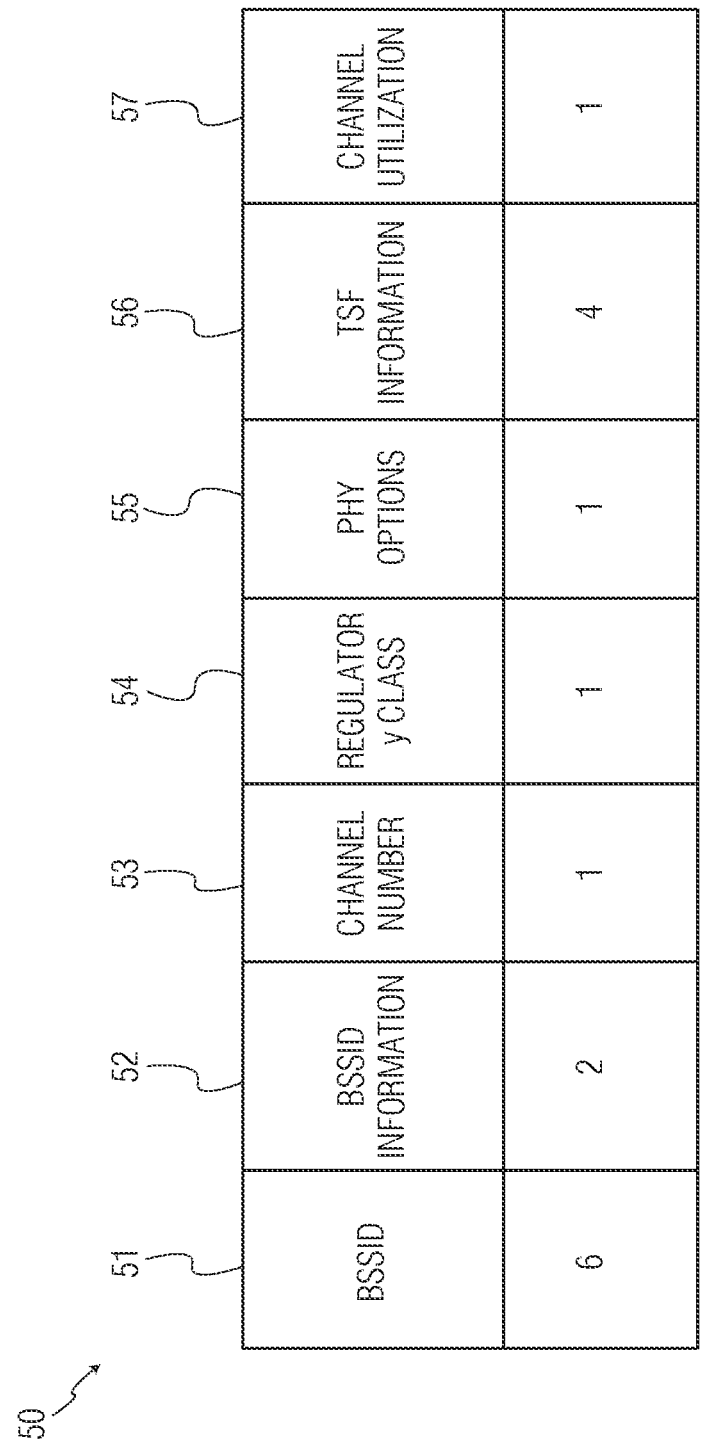
FIG. 3 depicts an AP announcement frame.

AP 24 may broadcast or transmit an AP announcement frame 50 (shown in FIG. 3). Regulatory domain information may be included in and conveyed with the report in a serving channel of an AP, or in a non-serving channel of a different AP. FIG. 3 depicts an AP announcement frame 50 that contains pertinent information on a collection of APs that are candidates to which STAs can roam.

A STA may determine the best AP to roam to in less time by allowing an AP to transmit frames announcing its capabilities in a channel where it is not serving (e.g., a non-serving channel). An AP announcement frame 50 as depicted in FIG. 3 provides this information. An AP sends this AP announcement frame 50 in non-serving channels being used by other neighboring APs. The AP announcement frame 50 contains the AP's serving channel, information about the AP's capabilities, and resource availability. The AP announcement frames provide information for STAs to decide the best AP candidate for roaming. AP announcement frame 50 can carry any measurement information, such as neighbor reports or channel load report. AP announcement frame 50 could be autonomously sent by APs (e.g., as a Class 1 frame carrying the same information or part of the information included in the beacon frames) or sent upon request of other STAs.

AP announcement frame 50 contains several fields 51-57. The BSSID field 51 is a 48-bit field of the same format as an IEEE 802 MAC address. This field uniquely identifies each BSS. The value of this field, in an infrastructure BSS, is the MAC address currently in use by the STA in the AP of the BSS.

The Channel Utilization field 53 indicates the fraction of the time an AP detected its serving channel being busy in the last beacon period. This gives an indication of the traffic load at the AP. Thus, upon receiving AP announcement frame 50, STAs could identify the capabilities through the BSSID information field 51 and traffic conditions at different APs through the channel utilization field 53. STAs could also measure the received power for the announcement frames and differentiate between nearby APs and faraway APs. Further, the STAs could maintain a priority list of AP candidates for roaming based on different factors, such as signal strength, traffic load, or a combination of both.

A regulatory class 54 is an index into a set of values for radio equipment sets of rules. For example, the regulatory classes specified for 5 GHz operation in the USA are enumerated in Table J.1 of 802.11j, IEEE Standard for Information technology-Telecommunications and information exchange between systems—Local and metropolitan area networks—Specific requirements Part 11: Wireless LAN Medium Access Control (MAC) and Physical Layer (PHY) specifications, Amendment 7: 4.9 GHz-5 GHz Operation in Japan As shown in Table 1 below, the PHY Options field 55 contains the Condensed PHY type and TSF offset Flag:

TABLE 1

PHY Options field 55

| B0 | B6 | B7 |
|---|---|---|
| Condensed PHY Type | | TSF offset Flag |
| Bits: 7 | | 1 |

Condensed PHY Type indicates the PHY type of the AP being reported. TSF offset Flag 26 is a one bit field. When it is set to 1 it indicates that a TSF Information field is present.
As shown in Table 2 below, the TSF Information is 4 octets long and contains TSF Offset and Beacon Interval subfields.

TABLE 2

TSF offset field format 56

| TSF Offset | Beacon Interval |
|---|---|
| Octets: 2 | 2 |

The Channel Utilization field 57 indicates the fraction of the time the AP detected its serving channel busy in the last beacon period.

Figure 4:
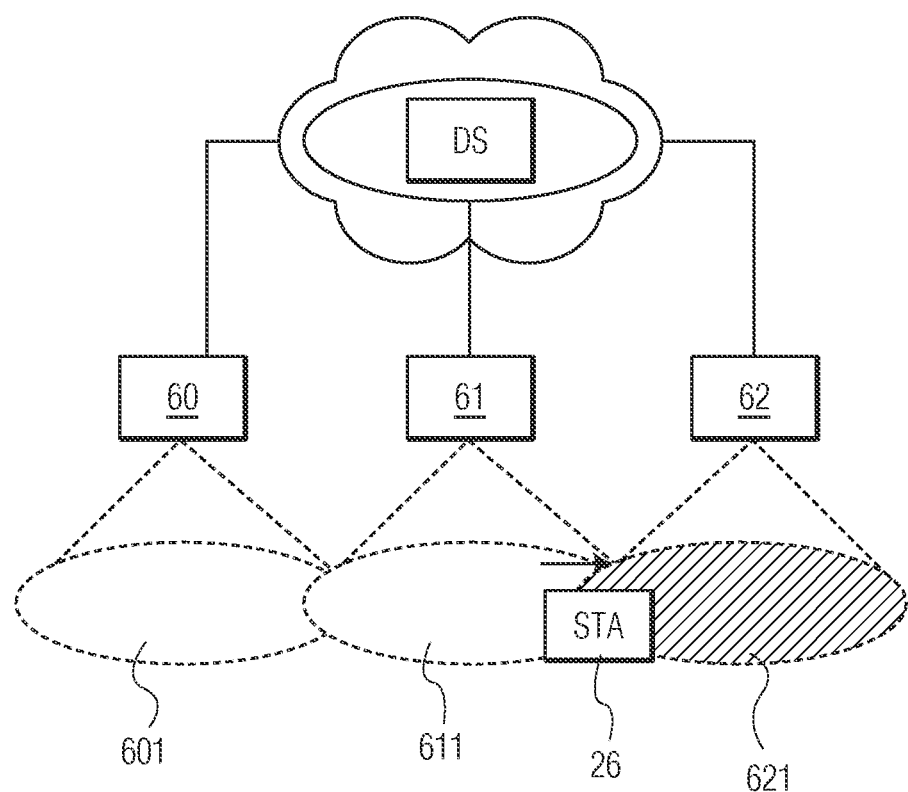
FIG. 4 depicts a DS with several APs, each AP having a coverage region.

The AP announcement frame 50 is extremely useful to reduce the delay and energy consumption in the roaming process. As an example, FIG. 4 depicts a scenario where STA 26 is currently communicating with AP 61 in first channel. AP 61 transmits information to STA 26 over its serving channel. AP 61 can transmit information corresponding to properties of AP 60 as well as AP 62, and the STA 26 can choose either the AP 60 or AP 62 to start a scan process based on those properties. According to the invention, AP 60 or AP 62 can also transmit in the serving channel of AP 61. This enables STA 26 to receive an announcement frame directly from AP 60 or AP 62 without relying on information communicated from AP 61 or from scanning a series of channels contained in a list. AP 60 and AP 62 can transmit an unsolicited AP announcement frame or can wait for STA 26 or another STA to request such a frame. Since STA 26 has access to additional information in a single channel, unlike the prior art, it can chose which AP will provide superior service and switch to that AP without first having to scan through a variety of channels to determine to which AP it should roam. This mitigates the situation where STA 26 would scan a channel associated with an AP that is out of range. For example, in FIG. 4, STA 26 is moving in the direction of coverage area 621. According to the prior art, STA 26 would have to scan a series channels associated with AP 62 and 60. Because STA 26 is not within coverage area 601, STA 26 avoids an unnecessary scan of the channel associated with AP 60. According to the invention, STA 26 simply listens in its operating channel for AP announcement frames. Thus, STA 26 need not scan the channel associated with AP 60 because it will not receive an AP announcement frame from AP 60 in its current operating channel.

If STA 26 starts moving in the direction of the AP 62 (i.e., from service area 611 corresponding to AP 61 to service area 621 corresponding to AP 62), according to prior art methods, if it tries to connect with the AP 60, it will waste time and energy. This can happen with 50% of probability if STA 26 scans only the neighbor table sent by the AP 62. With AP announcement frames 50 according to the invention, AP 62 could send periodic advertisements over the serving channel of AP 61. Then STA 26 would be able hear the announcement of the AP 62, and it could use this information to set AP 62 as its best candidate in case of a roaming. In case the STA 26 hears multiple announcements from different APs, it can define the priority based on the signal strength or on the channel utilization.

Additionally, an AP announcement frame 50 can trigger roaming processes not caused by mobility, but for resource-related reasons. For example, when several APs are available in a common area, a STA can start a roaming procedure to a candidate AP that has a lighter load than its current AP. This may be contained in a field of the AP announcement frame 50.

Figure 5:
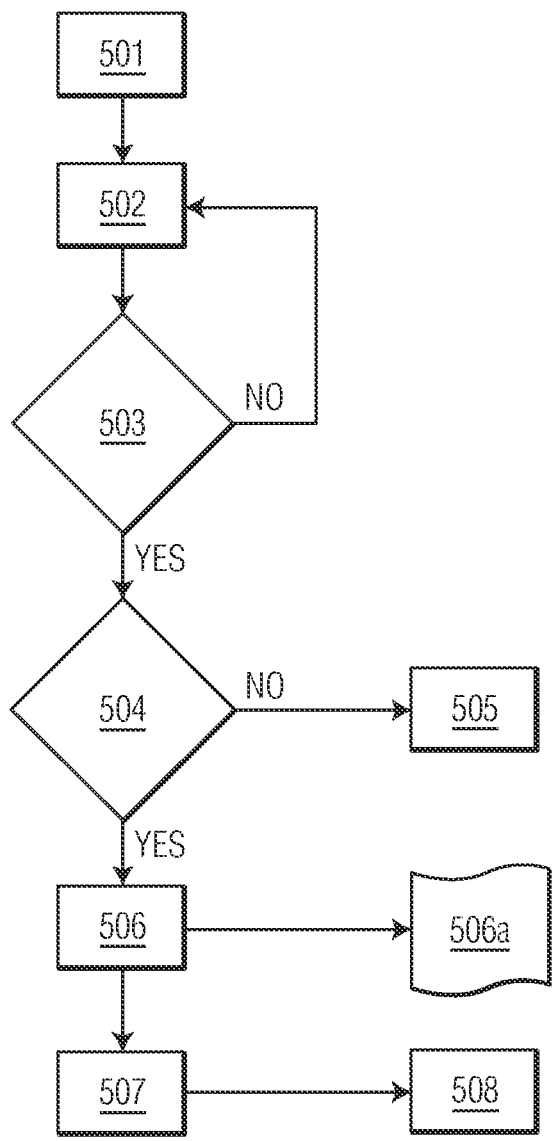
FIG. 5 depicts a scanning process when a roaming trigger event occurred.

FIG. 5 depicts how the invention can be used in the scanning process when a roaming trigger event has occurred. Step 501 begins the process. In step 502 a STA (i.e., STA 26) associated with an AP x (i.e., AP 60) operates in a channel y. In step 503, the STA checks whether a roaming event was triggered, for example, by a drop in signal strength indicating movement out of range for AP x. If no roaming event was triggered in step 503, STA continues its association with AP x in channel y and returns to step 502. If a roaming event is triggered in step 503, STA checks whether it received an announcement frame from any AP in step 504. If STA does not receive an announcement frame, it starts scanning AP candidates to find which AP is the best candidate for roaming according to prior art methods of selection in step 505. If STA does receive an announcement frame in step 504, it updates its Neighboring AP information in step 506. This can include, for example, received power, PHY options, AP capabilities, and channel utilization fields as indicated in update sub-step 506a. Once step 506 is complete, STA updates its AP candidate priorities in step 507. Then, in step 508, STA scans the highest priority AP. There is no deed for STA to switch channels in order to determine which AP is the best candidate for roaming. Additionally, the fact that a frame from a neighboring AP is used helps determine the signal strength whether an AP is reachable.

Figure 6:
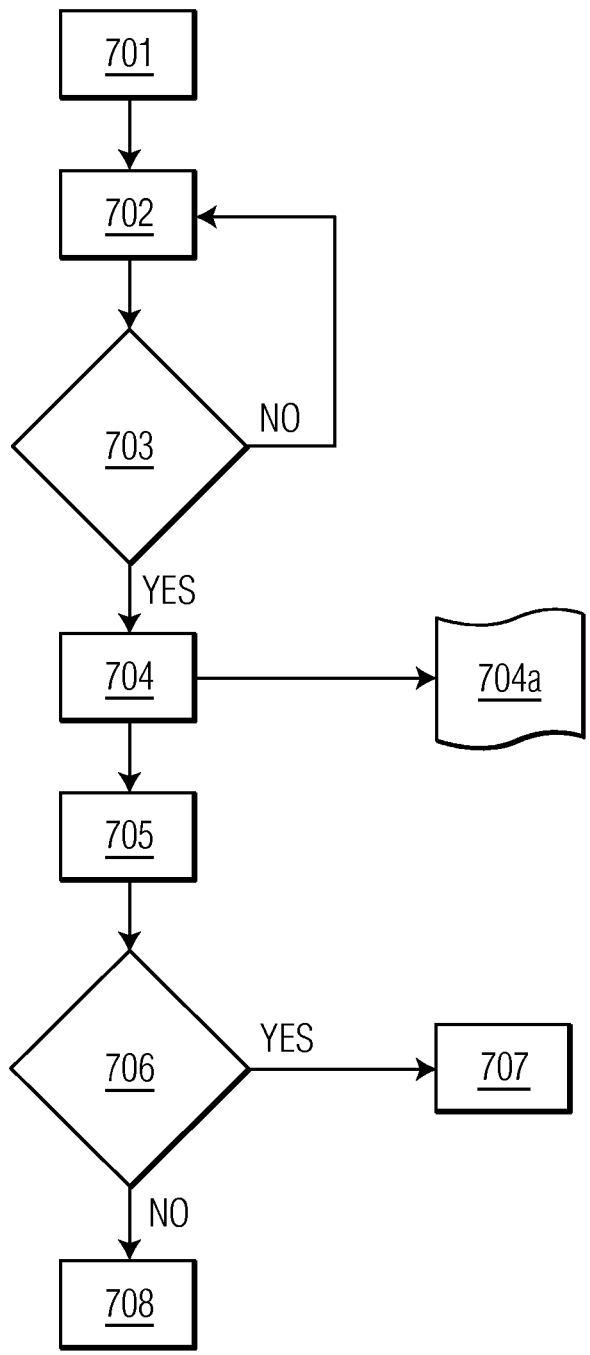
FIG. 6 depicts process for STAs to trigger roaming procedures.

FIG. 6 depicts a flow chart of a process for STAs to use the invention to trigger roaming procedures and perform scanning of AP candidates for roaming. The process in FIG. 6 is an alternative to the roaming trigger events and scanning procedure in FIG. 5. Step 701 begins the process. In Step 702, STA (i.e., STA 26) associated with an AP x (i.e., AP 60) operates in a channel y. In step 703, STA checks whether it received an announcement frame from any AP. If STA does not receive an announcement frame from an AP, it continues its association with AP x in channel y and returns to step 702. If STA does receive an announcement frame in step 703, it updates neighboring AP information in step 704. This can include, for example, received power, PHY options, AP capabilities, channel number, and channel utilization fields as indicated in update sub-step 704a. Upon completion of neighboring AP update in step 704, STA updates AP candidate priorities in step 705. STA then makes a decision in step 706 whether to start a roaming process. If STA decides not to roam (i.e., based on a preprogrammed protocol) it stays in the same channel with its current AP, as in step 708. If, however, STA decides to begin a roaming process in step 706, it starts scanning the highest priority AP (i.e., based on a prioritization enacted from the neighboring AP information and the AP announcement frame) in step 707.

This invention is applicable to any wireless standard in which a mobile station roams from one AP/base station/central controller to another.

This invention can be used in any network management solution to support fast roaming between APs and base stations. It can also be used in solutions to support fast roaming between different networks as well, which is called vertical handoff. For instance, roaming between cellular systems and WLAN hot spots, which has been considered an important functionality and a new opportunity for service providers in future wireless networks.

This invention is also applicable to some critical applications, such as patient monitoring, in which the wireless devices used to monitor the patients are usually small devices with limited battery life. In this kind of application the roaming process is critical because packet loss and power saving requirements are strict.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to effect these techniques, while remaining within the scope of the appended claims.

What is claimed is:

1. A method for signaling available channels in a wireless network comprising:
    communicating between a mobile station (STA) and a first access point (AP) in a channel;
    transmitting at least one AP announcement frame in said channel from a second AP, said channel being a non-service channel of said second AP, wherein said at least one AP announcement frame includes regulatory class information regarding the second AP;
    receiving the at least one AP announcement frame in the mobile station,
    determining from the received at least one AP announcement frame corresponding second APs that support service requirements of said mobile station and are reachable by said mobile station;
    prioritizing the determined second APs that support the service requirements of said mobile station and reachable by said mobile station into a prioritized list of second APs, said prioritization based on a received signal strength and said regulatory class information received in the at least one AP announcement frame associated with a corresponding second AP;
    responsive to a triggering event, the mobile station:
        selecting a second AP from the prioritized list of second APs, wherein the selected second AP includes an available channel corresponding to a channel the mobile device is operating on; and
        initiating communication with the selected second AP, wherein the mobile device communicates with the selected second AP without changing the channel the mobile device is operating on.

2. The method of claim 1, wherein the AP announcement frame further comprises at least one frame announcing service capabilities.

3. The method of claim 1, wherein the transmitting at least one AP announcement frame further comprises at least one frame announcing resource availability.

4. The method of claim 1, wherein the method further comprises transmitting at least one AP announcement frame in the channel from the first AP.

5. The method of claim 1, wherein the transmitting at least one AP announcement frame occurs upon request of one of: the mobile station, another mobile station and another AP.

6. The method of claim 1, wherein the transmitting at least one AP announcement frame further comprises an unsolicited transmission by the second AP.

7. The method of claim 1, further comprising:
    selecting a highest priority one of the APs on the prioritized list of APs after failing to select a second AP available for communication on the channel the mobile station is operating on.

8. The method of claim 1, wherein the transmitting at least one AP announcement frame further comprises transmitting measurement information.

9. The method of claim 8, wherein the measurement information further comprises at least one neighbor report.

10. The method of claim 9, wherein the neighbor report further comprises second AP information consisting of: received power, PHY options, AP capabilities, channel number, and channel utilization fields.

11. The method of claim 8, wherein the measurement information further comprises at least one channel load report.

12. The method of claim 1, further comprises updating second AP information in the mobile station.

13. A system for determining available channels in a wireless network comprising:
    a first access point (AP) capable of communicating with a mobile station [[ ]] in a channel;
    a second AP capable of transmitting at least one AP announcement frame on said channel, said channel being a non-service channel of said second AP, wherein said at least one AP announcement frame includes regulatory class information regarding the second AP;
    said mobile station (STA) comprising a processor:
        receiving the at least one AP announcement frame;
        determining from the received at least one AP announcement frame corresponding second APs that support service requirements of said mobile station and are reachable by said mobile station;
        prioritizing the determined second APs that support the service requirements and reachable by said mobile station into a prioritized list of second APs based on a received signal strength and said regulatory class information received in the at least one AP announcement frame; and
        responsive to a triggering event, the mobile station:
            selecting a second AP from the prioritized list of second APs, wherein the selected second AP includes an available channel corresponding to a channel the mobile station is operating on; and
            initiating communication with the selected second AP, wherein the mobile station communicates with the selected second AP without changing the channel the mobile station is operating on.

14. The system of claim 13, wherein the second AP transmits an AP announcement frame.

15. The system of claim 14, wherein the mobile station receives the at least one AP announcement frame from the second AP.

16. The system of claim 14, wherein the processor updates second AP information in the mobile station.

17. The system of claim 13, wherein the AP announcement frame further comprises capabilities of a corresponding AP.

18. The system of claim 13, wherein the mobile station receives the at least one AP announcement frame in its current operating channel from said second AP transmitting in its non-serving channel.

19. A mobile station (STA) comprising:
a receiving system configured to:
communicate with a first access point (AP) in a channel;
receive an access point (AP) announcement frame from a corresponding one of a plurality of APs, wherein the announcement frame is received in the channel which is a non-service channel of the one the plurality of APs;
a processor configured to:
identify AP capabilities based on information received in a corresponding AP announcement frame, said information including regulatory class information;
determine from the received AP announcement frames corresponding APs that support service requirements of said mobile station and are reachable by said mobile station;
prioritize the APs that support the service requirements of, and are reachable by, said mobile station into a prioritized list of APs, said prioritization being based on a received signal strength and the identified capabilities and regulatory class information associated with a corresponding AP; and
respond to a triggering event, wherein said response comprising:
selecting a second AP from the prioritized list of APs, wherein the selected second AP includes an available channel that corresponds to a channel the mobile station is operating on; and
initiating communication with the selected second AP, wherein the mobile station communicates with the selected second AP without changing the channel the mobile station is operating on.

20. The mobile station according to claim 19, wherein said AP announcement frame is transmitted on a non-service channel of a corresponding AP and received in a service channel of said mobile station.

21. The mobile station according to claim 19, wherein the AP announcement frame comprises measurement information.

22. The mobile station according to claim 21, wherein the measurement information comprises at least one neighbor report.

23. The mobile station of claim 22, wherein the neighbor report comprises second AP information consisting of: received power, PHY options, AP capabilities, channel number, and channel utilization fields.

24. The mobile station of claim 21, wherein the measurement information further comprises at least one channel load report.

25. The mobile station of claim 19, wherein the processor updates second AP information in the mobile station.

* * * * *